United States Patent Office

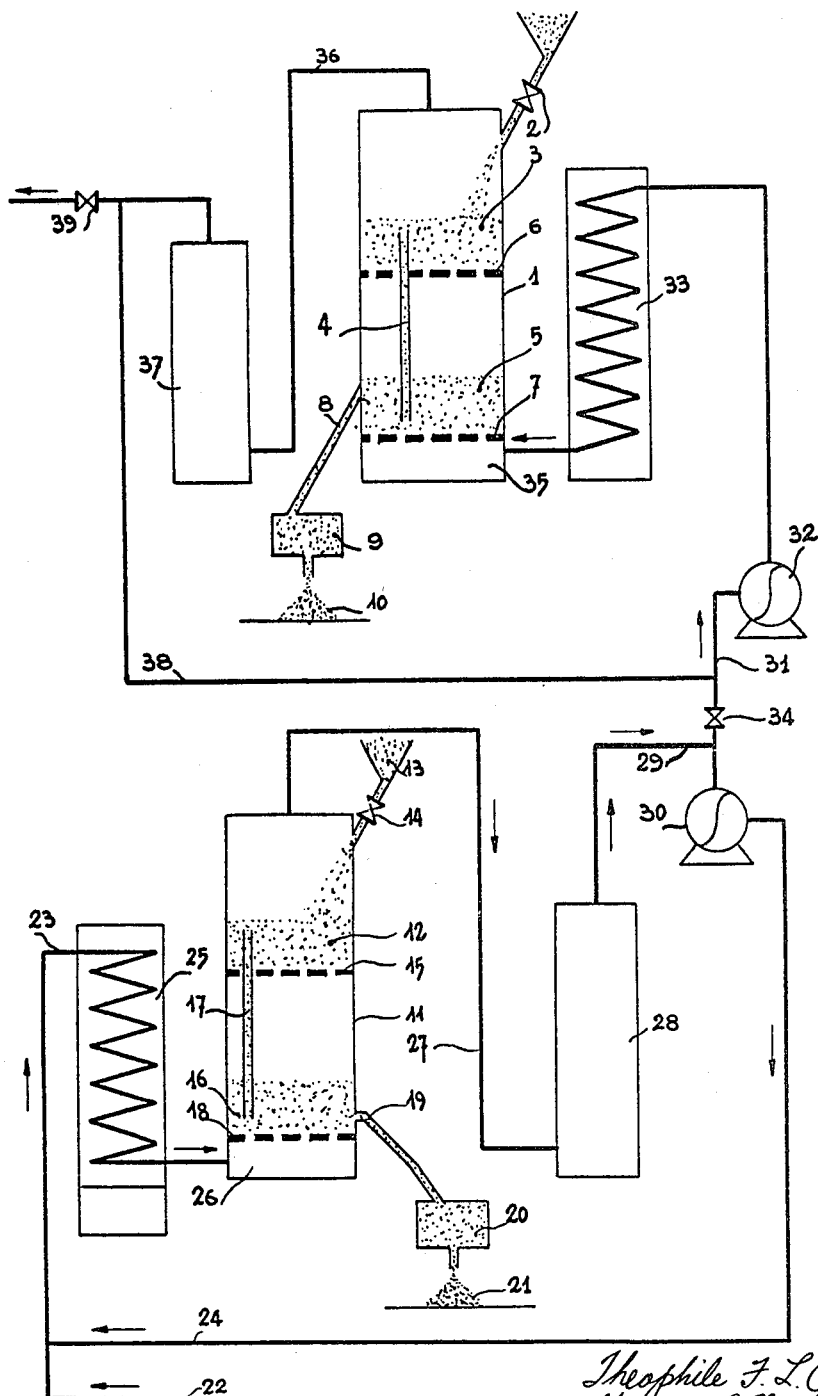

3,389,988
Patented June 25, 1968

3,389,988
PROCESS OF DIRECT REDUCTION OF IRON OXIDES IN FLUIDIZED BEDS
Theophile F. L. Cambon and Georges A. M. Igounenc, Toulouse, France, assignors to Office National Industriel de l'Azote, Toulouse, France, a corporation of France
Filed Apr. 1, 1965, Ser. No. 444,607
Claims priority, application France, May 27, 1964, 4,978
12 Claims. (Cl. 75—26)

ABSTRACT OF THE DISCLOSURE

The present disclosure relates to the industrial reduction of iron oxide utilizing hydrogen and without causing pyrophorism or sintering. The process involves partially reducing the iron oxide to about 60–75% of total reduction during a primary reduction stage followed by cooling down to at least 250° C. and as low as room temperature followed by reheating the partially reduced mixture of iron and iron oxide and completing reduction to iron at an elevated temperature lower than the temperature of the first stage reduction.

---

The reduction of iron oxides by hydrogen is a relatively simple reaction, the mechanism of which has been described by Chaudron. The transposition of the mechanism of this reaction to the industrial scale meets, however, with some difficulties, the most objectionable of which is the sintering of particles in the course of the transformation and pyrophorism of the resulting iron sponge.

It is known that when iron oxides are reduced at temperatures below 500°–550° C. it becomes necessary either to protect the iron particles from contact with air in order to avoid the spontaneous reoxidation thereof, or to subject them to an expensive passivation treatment. If the reduction is carried out at higher temperatures, such as above 600° C., the final product loses its pyrophoric properties, but the phenomenon of sintering appearing simultaneously is responsible for the more or less rapid agglomeration of the particles and this results in making it difficult to freely circulate the minerals; sintering of the minerals in the plant during the processing results in the presence of mineral blocks of various dimensions.

Both phenomena, pyrophorism and sintering, are directly related to the rate of recrystallization of the reduced iron, which has a distanded and unstable lattice after removal of the oxygen atoms. At moderate temperatures, the return of the lattice to a stable condition occurs slowly, permitting a high degree of porosity to persist, and this is responsible for the pyrophorism. On the other hand, the application of higher temperatures causes more rapid crystallization, and this results in disappearance of fine porosity and a tendency to agglomerate, which may spread more or less rapidly over the total mass.

It has been proposed, in order to avoid sintering to some extent, that a flow rate definitely higher than the minimum rate to provide fluidization might be adopted for the reducing gas. Turbulence, which would originate under such conditions, limits the contact time between the particles and reduces the risk of solidification. However, this measure proves insufficient when all the factors favoring rapid crystallization are present at once, as, for example, in the case of a natural iron oxide of high iron content which is in a stage of advanced reduction during high temperature processing.

Raw materials for the production of iron sponge used in ferrous metallurgy or in powder metallurgy are chosen from among the richest oxide minerals, practically free of gangue, such as magnetite concentrates or hematites from Brazil, Venezuela, Labrador or Mauritania, and these contain from 67% to 69% iron, after concentration.

It has been established that such minerals are susceptible to hydrogen reduction in a turbulent fluidized bed without the risk of sintering or of pyrophorism, if a rigorous thermal range, established according to the upper limit of the intended degree of reduction, is applied. These correlative values are given in Table I below:

TABLE I

| (1) Reduction temperature (°C) | (2) Upper limit of the degree of reduction (percent) |
|---|---|
| 750 | 75 |
| 700 | 78 |
| 650 | 82 |
| 600 | 88 |
| 580 | 92 |
| 570 | 94 |
| 550 | 99 |

Ending the operation at a temperature ranging between 550° and 580° C. seems to be in contradiction to the requirement of the greater reaction rates because these rates vary in accordance with the reduction temperatures applied.

It is accordingly an object of the present invention to provide a process of reducing iron oxide particles to 90–99% total reduction without risk of sintering or pyrophorism.

Other objects and the nature and advantages of the instant invention will be apparent from the following description taken in conjunction with the accompanying drawing, wherein:

The single figure is a diagrammatic flow sheet of the process in accordance with the present invention.

It has been found, according to one of the essential features of this invention that improved results are obtained if the reduction is carried out in two successive stages, separated by a cooling step. The mineral particles are partially reduced to about 60–75% of total reduction during a primary reduction stage followed by cooling down to at least 250° C. and as low as room temperature, if desired. As a result of this primary reduction and cooling, the reduction reactions in the course of the final reduction stage take place at high rates despite the relatively low temperatures used, and these reduction reactions continue without notable slowdown until the desired final degree of oxygen elimination is reached.

The intermediate cooling phase between the primary and final reduction stages is an essential condition for the achievement of the unexpected results obtained in the present invention. A decrease in operating temperature from 700° C. to a temperature of 555° C. at a point in the reduction reaction when reduction has attained 60%–75% of total reduction, causes a sharp drop in the reaction rate. On the contrary, however, when the mineral has been heated to 700° C. and is cooled at the same point in the reduction reaction to a temperature of at least 200–250° C. down to as low as room temperature, and then is reheated to 550–580° C. in a hydrogen atmosphere, the reduction occurs at a high rate. The reaction rate of reduction is obtained under these conditions which is surprisingly higher than is obtained at 700–750° C. without the intermediate cooling step.

The process, according to this invention, is brought about through several successive steps of operation:

(1) Preheating the mineral to 900°–1000° C. and the reducing gas to 800°–850° C.
(2) Primary reducing stage using a fluidized bed at 700°–750° C.; during this stage the reduction reaches 60% to 75% of total reduction.
(3) Cooling of the mineral which has been partially reduced in the preceding primary reducing stage.

(4) Reheating of the partially reduced product to 380°–450° C. and of the reducing gas to 700°–750° C.
(5) Final reduction stage using a fluidized bed at 550°–580° C.

Each of the reducing stages (2) and (5) can be carried out in one or in several successive phases. According to one of the preferred embodiments of this invention, the primary reducing stage is carried out in two phases, with two fluidized beds located in the same reactor or in two different ones, in series. This arrangement permits the transformation of $Fe_2O_3$ into FeO during the first phase of the primary reducing stage and then a partial reduction of this oxide to metallic iron in a second phase of the primary reducing stage.

Prior to the final reducing stage, the partially reduced mineral from the primary reducing stage which has been suitably cooled is continuously fed into a reactor which houses the final reducing stage of the process. This partially reduced mineral is preheated in this reactor and is fluidized by hot reduction gas from the final reducing treatment. After preheating, the partially reduced mineral is exposed to a continuous stream of fresh reducing gas which is rich in hydrogen and suitably heated in the final reducing stage.

The reducing gas leaving the preheating zone of the partially reduced mineral is treated to remove the water vapor therein formed in the reducing stage and is partially cycled to the primary reducing stage and partially recycled to the final reducing stage.

In the primary reducing stage, reducing gas leaving the first phase thereof is treated to remove the water vapor of reaction and is partially recycled to the second phase of the primary reducing stage; a purge of the remainder enables the regulation of the nitrogen concentration in the reducing gas.

It is understood that before preheating and the final reducing stage the partially reduced mineral may be stored wholly or partially at temperatures below 100° C. In case both reduction stages should not be carried out one after the other, there is no difficulty in transporting the primary reduction product to the place where final reduction will take place. It is, however, important for evident reasons of economy that both reactors, designed respectively to carry on each of the reducing stages, should operate in a continuous manner.

The following description, as a non-limitative example of the embodiment of the invention, will permit a better understanding of the essential features of the invention as well as of its mode of operation. For greater clarity, distinction will be made between the stream of the mineral and that of the reducing gas, which flow counter-currently through the equipment.

The starting product, chosen from minerals rich in iron, such as hematites or magnetite concentrates, and reduced to convenient particle size, is preheated to 900°–1000° C. and if required is reoxidized using conventional roasting equipment not shown in the schematic drawing. The material is continuously introduced into the first phase of the primary reduction stage at the upper bed 3 of the two-bed reactor 1, its rate of supply being regulated by a suitable device represented in the drawing by a valve 2. The product in the bed 3 is maintained in a fluidized state by an upwardly flowing current of reducing gas passing through a permeable plate 6 from the lower fluidized bed 5 constituting the second phase of the primary reduction stage. By contacting the mineral with the hydrogen reducing gas at 700°–750° C., the degree of oxidation of the iron is lowered, i.e., the total product flowing down from bed 3 to bed 5 through the transfer ducts 4 is composed of FeO. Correlatively, the hydrogen content of the reducing gas flowing upwardly from bed 3 decreases and its water vapor content increases.

The lower bed 5 has a temperature maintained at a level between 500° and 750° C., and is fluidized by an upwardly flowing current of regenerated reducing gas which passes the permeable plate 7. During this second phase of the primary reduction stage, FeO is partially reduced to metallic iron. The mixed FeO and iron are continuously removed from the reactor through a discharge tube 8 and passed continuously through an exchanger-cooler 9. If the cooling of the product from the primary treatment to below 100° C. is not desirable, the product may be conveyed to the final reduction stage by a system of ducts not in contact with air. In the case represented in the drawing, it is cooled to room temperature and stored in the open.

The partially reduced material 10 is submitted to the final reduction stage in the reactor 11. The material 10 is fed to the fluidized layer 12 from a hopper 13 through a valve 14. The partially reduced material in the bed 12 is maintained in suspension and is preheated to 400°–420° C. by the upwardly flowing current of partially used hot, reducing gas from the final reduction stage which passes through the permeable plate 15. No reaction takes place in bed 12, since the temperature thereof is too low for reduction processes to occur and the water vapor content thereof, from 7% to 12%, also being too low to give to the gas mixture an oxidizing potential with regard to the reduced iron.

The partially reduced mineral material preheated in the above manner flows down to the bed 16 through transfer duct 17. The bed 16 is also fluidized by an ascending current of hot reducing gas, rich in hydrogen, passing through the permeable plate 18. During this stage, the degree of reduction of the product increases, according to the operating conditions, from an initial 60%–75% total reduction to a final 90%–99% total reduction. The product then leaves the reactor 11 through a discharge 19 and passes to an exchanger-cooler 20. From there the final product, iron sponge 21, is directed to a magnetic classifier operating at ambient temperature and is stored for a possible final finishing treatment.

The reducing gas for the entire process, rich in hydrogen, may be taken from a plant for the catalytic conversion of hydrocarbons by means of water vapor and/or oxygen; such a gas must be scrubbed in order to remove carbon dioxide and carbon monoxide present in the gas, or, speaking in more general terms, the reducing gas may be prepared in any plant yielding 90%–100% pure hydrogen, practically free of carbon dioxide and carbon monoxide.

The fresh reducing gas is introduced through a line 22 into a collector 23, where it is mixed with the recycled reducing gas coming through a conduit 24, and is preheated to 700°–750° C. in a heat exchanger 25 before being fed into a space 26 in the lower part of the reactor 11. Thereafter, as mentioned before, this gas passes successively from the bottom to the top through the beds 16 and 12, causing final reduction of the product in the bed 16 and preheating the product in the bed 12.

The reducing gas, containing 7%–12% of water vapor, leaves the reactor 11 through duct 27, passes through several standard type dust traps not shown in the drawing, and then through a condenser 28 wherein the reaction water is separated out.

From a collector line 29, part of the gas leaving the condenser 28 is sucked up by a compressor 30 and is recycled through the conduit 24 to the inlet collector 23.

The remainder of the regenerated reducing gas is directed toward the primary reduction stage through a conduit 31, a compressor 32, and the heat exchanger 33; the flow of the gas is controlled by a valve 34. Preheated to 800°–850° C. in the heat exchanger 33, the gas is then fed into the reactor 1 successively from the bottom to the top, through the two fluidized beds 5 and 3, maintaining them in a fluidized state and reducing the iron oxides of which the beds are composed, as described heretofore.

The gas leaving reactor 1 through duct 36 is poor in hydrogen and is stripped of dust by one or several dust traps not shown in the drawing, freed from water vapor which it carries in condenser 37, and is then partly recycled to the primary reduction zone through a duct 38, while the excess is purged through a suitably adjusted valve 39.

The two following examples relating to the flow-sheet of the attached drawing are given in order to gain a better understanding of the invention and the results it makes possible. These examples refer to the production of 90% and 99% reduced iron sponge, respectively. For the sake of simplification, the operating conditions leading to such results are represented in Tables II and III.

In the two examples the starting material is granular, with a particle size below 1 mm. and is obtained by grinding hematite containing 69% iron.

TABLE II.—I—PROCESS OF PRIMARY REDUCTION

| Operating Conditions | Example I | | | Example II | | |
|---|---|---|---|---|---|---|
| Temperatures (° C.): | | | | | | |
| Mineral charge fed into bed (3), at (2) | 930 | | | 900 | | |
| Mineral charge fluidized in bed (3) | 725 | | | 700 | | |
| Reducing gas fed into bed (3) | 700 | | | 700 | | |
| Mineral charge fluidized in bed (5) | 700 | | | 700 | | |
| Reducing gas fed into bed (5), at (35) | 850 | | | 825 | | |
| Gas Rates (m.³ gas/ton of mineral): | | | | | | |
| Reducing gas fed into bed (3) | 1,160 | | | 2,137.5 | | |
| Reducing gas leaving (36) | 1,160 | | | 2,137.5 | | |
| Reducing gas fed into bed (5), at (35) | 1,160 | | | 2,137.5 | | |
| Reducing gas fed into the primary reduction stage at (34) | 420 | | | 516 | | |
| Reducing gas purged from the primary stage at (39) | 60 | | | 66 | | |
| Reducing gas leaving bed (5) | 1,160 | | | 2,137.5 | | |
| | H₂ | N₂ | H₂O | H₂ | N₂ | H₂O |
| Percent Composition of Reducing Gas: | | | | | | |
| Reducing gas fed into bed (3) | 69.1 | 13.8 | 17.1 | 71.6 | 15.8 | 12.6 |
| Reducing gas leaving (36) | 55.0 | 13.8 | 31.2 | 63.1 | 15.8 | 21.1 |
| Reducing gas fed into bed (5), at (35) | 86.2 | 13.8 | 0 | 84.2 | 15.8 | 0 |
| Reducing gas fed into the primary reduction stage at (34) | 97.2 | 2.8 | 0 | 97.5 | 2.5 | 0 |
| Reducing gas purged from the primary stage at (39) | 80.0 | 20.0 | 0 | 80.0 | 20.0 | 0 |
| Reducing gas leaving bed (5) | 69.1 | 13.8 | 17.1 | 71.6 | 15.8 | 12.6 |
| Mineral Reduction (percent): | | | | | | |
| Mineral introduced into bed (3), at (2) | 0 | | | 0 | | |
| Mineral leaving bed (3), in (4) | 27 | | | 30 | | |
| Mineral leaving bed (5), in (9) | 60 | | | 75 | | |

TABLE III.—II—PROCESS OF SECONDARY REDUCTION

| Operating Conditions | Example I | | | Example II | | |
|---|---|---|---|---|---|---|
| Temperatures (° C.): | | | | | | |
| Partially reduced mineral charge in (13) | Ambient Temperature | | | | | |
| Mineral charge in the pre-heating bed (12) | 410 | | | 420 | | |
| Mineral charge in bed (16) | 580 | | | 550 | | |
| Reducing gas entering layer (16) | 740 | | | 700 | | |
| Gas Rates (m.³ gas/ton charge): | | | | | | |
| Reducing gas fed to layer (16), in (26) | 1,539 | | | 1,843.3 | | |
| Initial feed of reducing gas at (22) | 600 | | | 660 | | |
| Reducing gas from secondary reduction stage at (34) | 420 | | | 516 | | |
| Reducing gas leaving reactor (11), at (27) | 1,539 | | | 1,843.3 | | |
| | H₂ | N₂ | H₂O | H₂ | N₂ | H₂O |
| Percent Composition of Reducing Gas: | | | | | | |
| Reducing gas fed to layer (16), in (26) | 97.4 | 2.6 | 0 | 97.6 | 2.4 | 0 |
| Initial feed of reducing gas at (22) | 98.0 | 2.0 | 0 | 98.0 | 2.0 | 0 |
| Reducing gas from secondary reduction stage at (34) | 97.2 | 2.8 | 0 | 97.5 | 2.5 | 0 |
| Reducing gas leaving reactor (11), at (27) | 85.7 | 2.6 | 11.7 | 89.8 | 2.4 | 7.8 |
| Charge Reduction, percent: | | | | | | |
| Mineral charge in the pre-heating bed (12) | 60 | | | 75 | | |
| Reduced mineral charge leaving bed (16) | 90 | | | 99 | | |

It will be obvious to those skilled in the art that various changes may be made without departing from the spirit of the invention and therefore the invention is not limited to what is shown in the drawings and described in the specification, but only as indicated in the appended claims.

What is claimed is:

1. In a process of reducing iron oxide particles in a plurality of fluidized beds in series by passing a hydrogen rich reducing gas counter current to the iron oxide particles, the improvement comprising partially reducing said iron oxide at an elevated temperature to produce a mixture of iron and FeO, cooling the partially reduced iron oxide to a reduced temperature, reheating said partially reduced iron oxide, and finally reducing the partially reduced iron oxide to iron at 550–580° C.

2. A process in accordance with claim 1 wherein said iron oxide consists of 67–69% iron.

3. A process in accordance with claim 1 wherein said partial reduction amounts to 60–75% of total reduction.

4. A process in accordance with claim 3 wherein the final reduction completes the reduction to 90–99% of total reduction.

5. A process in accordance with claim 1 wherein said cooling reduces the temperature of said partially reduced oxide to below about 250° C.

6. A process in accordance with claim 1 wherein said partial reduction is carried out at 700°–750° C.

7. A process of 90–99% reducing iron oxide particles consisting of 67–69% iron comprising the steps of:
 (1) heating the iron oxide to about 900–1000° C.;
 (2) heating a first portion of reducing gas rich in hydrogen to about 800–850° C.;
 (3) fluidizing said iron oxide with said first gas at about 700–750° C. to reduce said iron oxide to 60–75% of total reduction;
 (4) cooling said partially reduced iron oxide to a temperature below about 250° C.;
 (5) reheating said partially reduced iron oxide to 380°–450° C.;
 (6) heating a second portion of reducing gas rich in hydrogen to 700°–750° C.; and
 (7) fluidizing said partially reduced iron oxide with said second gas portion at 550°–580° C. to reduce said partially reduced iron oxide to 90–99% of total reduction.

8. A process in accordance with claim 7 wherein said partially reduced iron oxide is cooled to a temperature below 100° C.

9. A process in accordance with claim 7 wherein the fluidizing of step (3) is carried out in two phases in series, the iron oxide being partially reduced to FeO in the first phase and further reduced to 60–75% of total reduction in the second phase, the temperature of said first phase being 700°–750° C. and the temperature of said second phase being 500°–750° C.

10. A process in accordance with claim 7 wherein said step (5) is carried out by fluidizing said partially reduced iron oxide with the gas leaving step (7).

11. A process in accordance with claim 10 wherein said partially reduced iron oxide is reheated in step (5) to 400°–420° C.

12. In a process of reducing iron oxide particles in a plurality of fluidized beds in series by passing a hydrogen-rich reducing gas counter-current to the iron oxide particles, the improvement comprising partially reducing said iron oxide at an elevated temperature to an amount of 60–75% total reduction to produce a mixture of iron and FeO, cooling the partially reduced iron oxide to a lowered temperature below 250° C., reheating said partially reduced iron oxide, and finally reducing at 550–580° C. the partially reduced iron oxide to iron to complete a total reduction of 90–99%.

(References on following page)

References Cited

UNITED STATES PATENTS

| | | | |
|---|---|---|---|
| 2,915,379 | 12/1959 | Agarwal | 75—26 |
| 2,947,620 | 8/1960 | Whitehouse et al. | 75—26 |
| 3,118,757 | 1/1964 | Peras | 75—26 |
| 3,131,052 | 4/1964 | Peras | 75—26 |
| 3,148,972 | 9/1964 | Peras | 75—26 |
| 2,864,686 | 12/1958 | Agarwal | 75—26 X |

BENJAMIN HENKIN, *Primary Examiner.*